United States Patent
Lebedev et al.

(10) Patent No.: US 10,712,436 B2
(45) Date of Patent: Jul. 14, 2020

(54) WIRELESS FISH FINDER SENSOR HOLDER

(71) Applicants: Alexander Lebedev, Seattle, WA (US); Nina Ethel Kaseburg, Seattle, WA (US)

(72) Inventors: Alexander Lebedev, Seattle, WA (US); Nina Ethel Kaseburg, Seattle, WA (US)

(*) Notice: Subject to any disclaimer, the term of this patent is extended or adjusted under 35 U.S.C. 154(b) by 373 days.

(21) Appl. No.: 15/788,670

(22) Filed: Oct. 19, 2017

(65) Prior Publication Data
US 2019/0120949 A1   Apr. 25, 2019

(51) Int. Cl.
| | |
|---|---|
| *G01S 7/521* | (2006.01) |
| *G10K 11/00* | (2006.01) |
| *G01S 15/96* | (2006.01) |
| *G01S 7/00* | (2006.01) |

(52) U.S. Cl.
CPC .............. *G01S 7/521* (2013.01); *G01S 7/003* (2013.01); *G01S 15/96* (2013.01); *G10K 11/006* (2013.01)

(58) Field of Classification Search
CPC ............................... G01S 15/96; G10K 11/006
USPC ............................................................ 43/54.1
See application file for complete search history.

(56) References Cited

U.S. PATENT DOCUMENTS

| | | | | | |
|---|---|---|---|---|---|
| 2,646,950 | A | * | 7/1953 | Nelson ................. | G10K 11/006 248/694 |
| 3,729,162 | A | * | 4/1973 | Salvato ................. | G10K 11/355 248/292.13 |
| 4,979,153 | A | * | 12/1990 | Terry ..................... | A01K 79/00 340/573.2 |
| 4,982,924 | A | * | 1/1991 | Havins .................. | G01S 7/521 248/288.31 |
| 5,016,225 | A | * | 5/1991 | Blomberg ............ | G10K 11/006 248/205.5 |
| 5,526,765 | A | * | 6/1996 | Ahearn .................. | B63B 49/00 114/221 R |
| 5,573,221 | A | * | 11/1996 | Reeves ................. | B63H 20/007 248/640 |
| 5,887,376 | A | * | 3/1999 | Currier .................. | G01S 15/96 367/107 |
| 6,019,333 | A | * | 2/2000 | Waller ................... | B63B 49/00 114/343 |
| 6,065,420 | A | * | 5/2000 | Smith .................... | B63B 49/00 114/343 |

(Continued)

*Primary Examiner* — Claude J Brown
(74) *Attorney, Agent, or Firm* — Ellenoff Grossman & Schole LLP; James M. Smedley; Alex Korona

(57) ABSTRACT

Apparatus and associated methods relate to a sensor holder adapted to float with a bobbing action when partially submerged in a liquid, while maintaining an air pocket within a first open holder end above the liquid, and removably retaining an electronic sensor in a liquid tight compartment disposed within a second holder end submerged in the liquid. In an illustrative example, the holder may be a substantially conical funnel. The open holder end may be, for example, open to the atmosphere, permitting wireless connection with the electronic sensor. In some examples, the holder may slidably retain a float rod adapted to allow the liquid to freely and vertically displace the holder as the liquid level varies. Various examples may advantageously provide automatic adjustment of the holder position to preserve a wireless connection with a retained electronic fishing sensor, maintaining the air pocket above the sensor as the liquid level varies.

18 Claims, 6 Drawing Sheets

(56) References Cited

U.S. PATENT DOCUMENTS

| | | | | |
|---|---|---|---|---|
| 10,012,731 B2* | 7/2018 | Pelin | ................... | G01S 7/6272 |
| 10,079,010 B1* | 9/2018 | Bradley | ............... | G10K 11/006 |
| 2006/0050615 A1* | 3/2006 | Swisher | ................. | G01S 7/521 |
| | | | | 367/173 |
| 2008/0025149 A1* | 1/2008 | Snyder | ................. | G10K 11/006 |
| | | | | 367/173 |
| 2013/0215719 A1* | 8/2013 | Betts | ....................... | G01S 7/521 |
| | | | | 367/88 |
| 2013/0283670 A1* | 10/2013 | Parys | ................... | A01M 1/103 |
| | | | | 43/107 |
| 2015/0251736 A1* | 9/2015 | Albin | ..................... | G01S 7/521 |
| | | | | 248/297.21 |
| 2019/0033266 A1* | 1/2019 | Sumption | .......... | G01N 29/2487 |

* cited by examiner

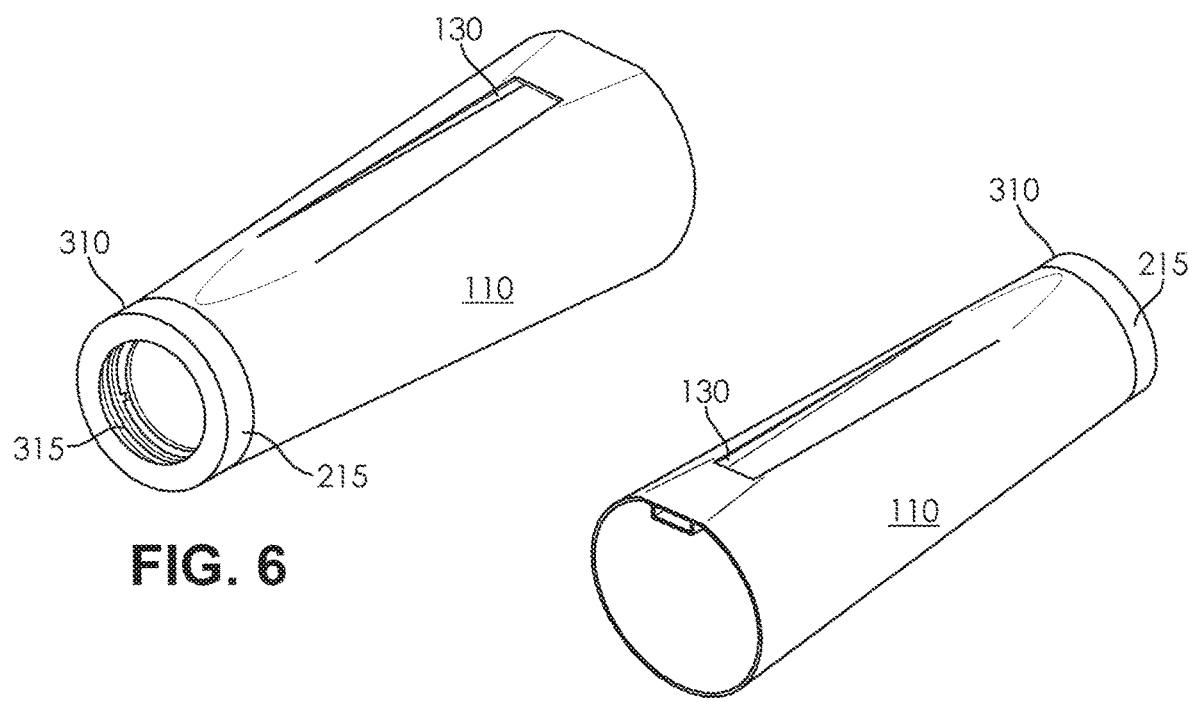
FIG. 6
FIG. 7
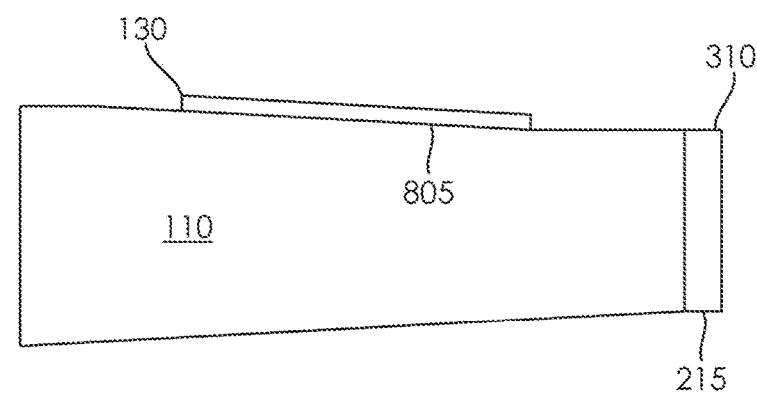
FIG. 8
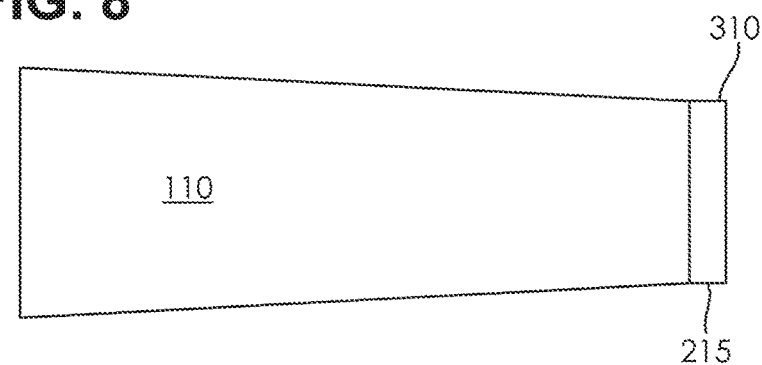
FIG. 9

WIRELESS FISH FINDER SENSOR HOLDER

TECHNICAL FIELD

Various embodiments relate generally to fish finder sensor mounts.

BACKGROUND

A fish finder is a device that may be used to detect fish. Some fish finders may detect fish based on analysis of sound waves reflected by fish or other underwater objects. A fish finder using sound waves to detect fish may include a sound emitter and a sound sensor. Some fish finders may locate fish by detecting sound waves reflected by fish in the water beneath a fishing boat. For example, a fish finder may emit sound waves into the water beneath a fishing vessel, and analyze reflected sound waves detected by the sound sensor. Some fish finders are adapted to discriminate between fish and underwater structures based on computational analysis of sound waves reflected by underwater objects.

Some fish finders display fish or underwater structures via a user interface. In some examples, wires may connect the user interface to a fish finder. Some fish finders include wireless interfaces. Some mobile computing devices, such as smartphones and tablets, may be adapted to provide a wireless fish finder user interface. For example, some fish finder sensors may include a wireless interface configured to allow a mobile computing device to communicate with and control the wireless fish finder. For example, in some scenarios, a mobile application configured on a mobile computing device may allow a user to view fish or underwater structure, on the mobile device display wirelessly coupled with the fish finder.

A fish finder may not effectively detect fish or underwater structure if the fish finder's sound emitter or sound sensor is not submerged under water. Sound waves reflected back from the fish or underwater structure to a fish finder's sound sensor may efficiently propagate through the water without noticeable degradation of the reflected sonic signal. In some scenarios, a wireless fish finder submerged in water may lose the wireless connection to a wirelessly coupled mobile computing device. For example, the wireless signal from a fish finder submerged in water may be degraded due to attenuation of the wireless signal by the water.

In some scenarios, a user operating a wireless fish finder may be required to frequently adjust the wireless fish finder mount to maintain a wireless data connection between the wireless fish finder and a mobile device. For example, a user may need to adjust the fish finder mount so that the sonic emitter and sensor are under water while the wireless interface is above water. In some scenarios, such as using a fish finder from a kayak or canoe while trolling, the water level may continuously change, resulting in frequently lost fish finder signals and higher fish finder mount adjustment workload for the user.

SUMMARY

Apparatus and associated methods relate to a sensor holder adapted to float with a bobbing action when partially submerged in a liquid, while maintaining an air pocket within a first open holder end above the liquid, and removably retaining an electronic sensor in a liquid tight compartment disposed within a second holder end submerged in the liquid. In an illustrative example, the holder may be a substantially conical funnel. The open holder end may be, for example, open to the atmosphere, permitting wireless connection with the electronic sensor. In some examples, the holder may slidably retain a float rod adapted to allow the liquid to freely and vertically displace the holder as the liquid level varies. Various examples may advantageously provide automatic adjustment of the holder position to preserve a wireless connection with a retained electronic fishing sensor, maintaining the air pocket above the sensor as the liquid level varies.

Various embodiments may achieve one or more advantages. For example, some embodiments may improve a user's ease of installing and adjusting a wireless fish finder. This facilitation may be a result of reducing the user's effort adjusting the fish finder mount to configure the fish finder sensor in the user's fishing boat. In some embodiments, the depth of the sonic sensor submerged in the water and an air pocket above the sensor wireless interface may be automatically adapted as the water level varies. Such automatic sensor depth and wireless sensor air pocket maintenance may reduce a user's effort in adjusting the sensor mount to maintain the sensor wireless connection. Some embodiments may improve the accuracy of detection for underwater objects located by a wireless fish finder. Such improved object detection accuracy may be a result of automatically adjusting the sensor depth to maintain the sensor below water while positioning the wireless interface above water.

Some embodiments may increase the reliability of a wireless connection between a wireless fish finder sensor and a user's mobile computing device. Such increased wireless connection reliability may be a result of retaining a fish finder sensor's wireless interface in an air pocket configured to maintain the wireless connection, while automatically maintaining the sensor below water. Such automatic sensor depth adjustment while maintaining an air pocket above the wireless interface may improve the user's fishing experience. In some embodiments, the effort required by a user to reliably locate fish when trolling with the sensor mounted to a user's kayak or canoe may be reduced. Such reduced effort to reliably locate fish when trolling may be a result of automatically adapting the fish finder sensor depth as the water level varies.

The details of various embodiments are set forth in the accompanying drawings and the description below. Other features and advantages will be apparent from the description and drawings, and from the claims.

BRIEF DESCRIPTION OF THE DRAWINGS

FIG. 6 depicts a bottom perspective view of an exemplary sensor holder.

FIG. 7 depicts a top perspective view of an exemplary sensor holder.

FIG. 8 depicts a side view of an exemplary sensor holder.

FIG. 9 depicts a top view of an exemplary sensor holder.

Like reference symbols in the various drawings indicate like elements.

DETAILED DESCRIPTION OF ILLUSTRATIVE EMBODIMENTS

To aid understanding, this document is organized as follows. First, the design and use of an exemplary sensor holder adapted to float with a bobbing action when partially submerged in a liquid, while maintaining an air pocket within a first open holder end above the liquid, and removably retaining an electronic sensor in a liquid tight compartment disposed within a second holder end submerged in the liquid, is briefly introduced with reference to FIGS. 1-4. Second, with reference to FIGS. 5A-5C, the discussion turns to exemplary embodiments that illustrate an exemplary sensor holder automatically maintaining an air pocket configured to maintain a wireless connection to a sensor retained within the holder, while maintaining a portion of the sensor below water. Specifically, the sensor holder is depicted in various views illustrating the bobbing action of the sensor holder due to vertical displacement by the boat wake of the holder along the longitudinal axis of the float rod. Finally, with reference to FIGS. 6-12, various views illustrative of exemplary sensor holder design are described.

Figure 1:
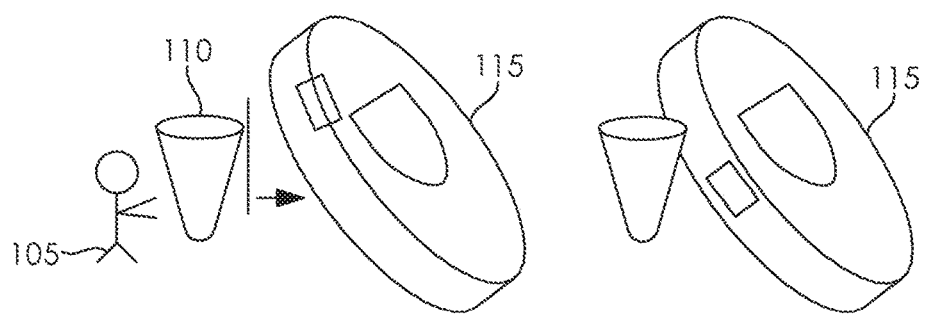
FIG. 1 depicts an operational view of an exemplary sensor holder adapted to float with a bobbing action when partially submerged in a liquid, while maintaining an air pocket within a first open holder end above the liquid, and removably retaining an electronic sensor in a liquid tight compartment disposed within a second holder end submerged in the liquid.
Figure 1:
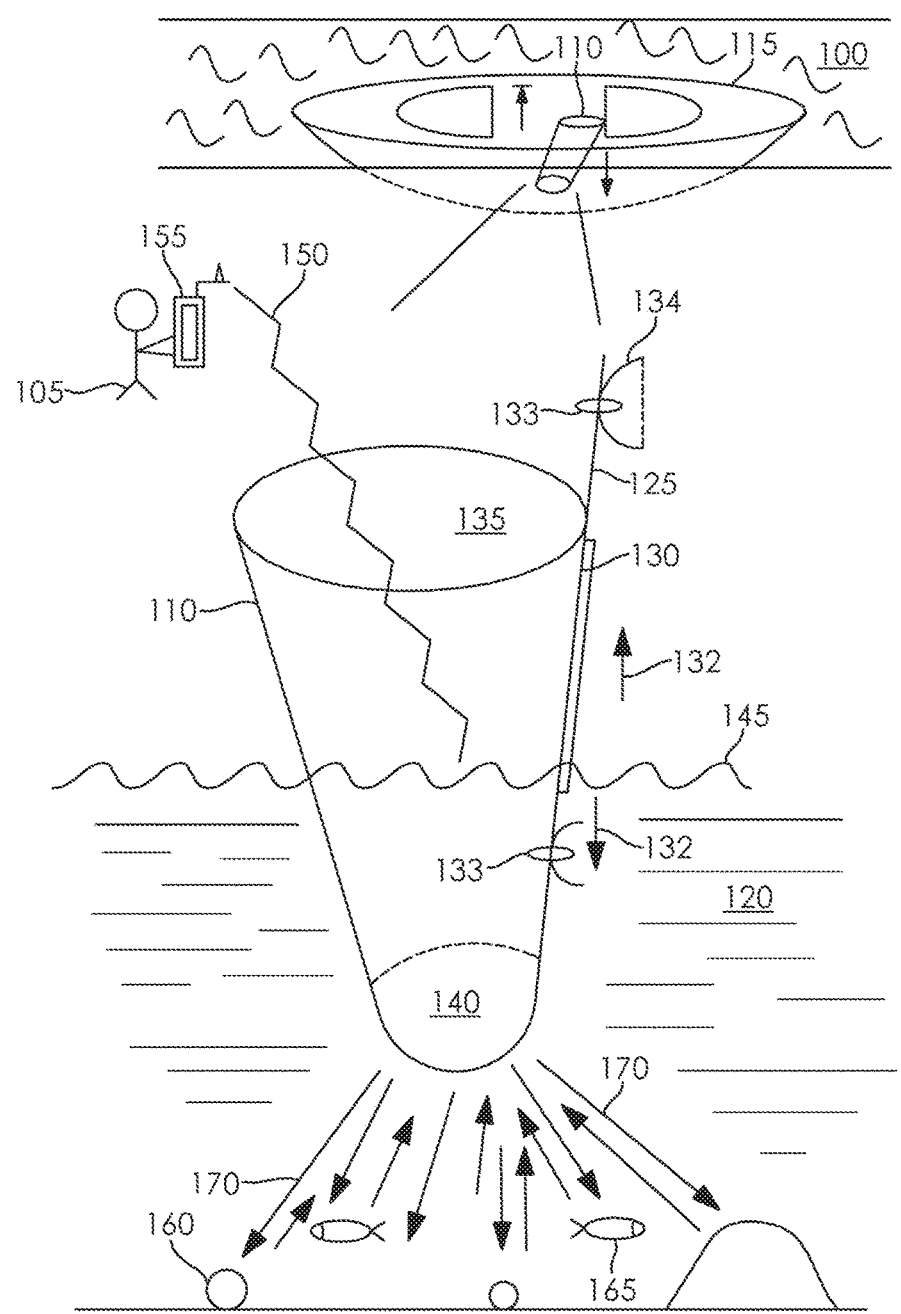

FIG. 1 depicts an operational view of an exemplary sensor holder adapted to float with a bobbing action when partially submerged in a liquid, while maintaining an air pocket within a first open holder end above the liquid, and removably retaining an electronic sensor in a liquid tight compartment disposed within a second holder end submerged in the liquid. In FIG. 1, the user 105 mounts the sensor holder 110 to the fishing vessel 115. In the depicted embodiment, the fishing vessel 115 is a kayak. In some embodiments, the fishing vessel 115 may be a canoe. In some scenarios, the fishing vessel 115 may be an inflatable raft. In various examples, the fishing vessel 115 may be any type of water craft useful for fishing. In the illustrated example, the user 105 places the fishing vessel 115 with the mounted sensor holder 110 on the surface 100 of a body of water 120. In the depicted example, the sensor holder 110 is partially submerged in the body of water 120 such that a first portion of the sensor holder 110 remains above the water 120 surface 100, and a second portion of the sensor holder 110 remains below the water 120 surface 100. In the illustrated embodiment, the sensor holder 110 slidably retains the float rod 125 within the float rod retaining slide 130. In the depicted embodiment, the sensor holder floats in the water 120 with bobbing action 132 due to vertical displacement of the floating sensor holder 110 by the water 120. In the depicted embodiment, the vertical displacement of the sensor holder 110 is constrained to a fraction of the float rod 125 length by float stop 133 disposed substantially at the lower end of sensor holder 110. In some embodiments, a second float stop 133 may be disposed substantially at the upper end of the sensor holder 110 to further constrain the vertical displacement of the floating sensor holder 110 in the water 120. In the depicted embodiment, the sensor holder 110 is removably secured to the fishing vessel 115 by the suction cup 134. In the illustrated embodiment, the bobbing action 132 of the sensor holder 110 along the longitudinal axis of the float rod 125 maintains the air pocket 135 within the open end of the sensor holder 110 while the water 120 level varies. In the depicted embodiment, the bobbing action 132 of sensor holder 110 also maintains the wireless fishing sensor 140 immersion in the water 120 as the water 120 level varies due to waves 145 on the water 120 surface 100. In the illustrated embodiment, the wireless fishing sensor 140 is configured with a wireless data interface disposed within the sensor holder 110 to communicate with other wireless devices. In the depicted embodiment, the wireless fishing sensor 140 data interface may communicate via radio frequency energy propagated through the air pocket 135. In the depicted embodiment, the wireless fishing sensor 140 is configured with a sonic emitter and sonic detector adapted to transmit and receive sound waves adapted to detect fish and objects submerged in the water 120. In the illustrated embodiment, the waves 145 may be a result of a wake due to fishing vessel 115 motion in the water 120. In an illustrative example, the motion of fishing vessel 115 may be a result of trolling. In the depicted embodiment, the air pocket 135 maintained within the sensor holder 110 stabilizes the wireless connection 150 communication channel coupling the wireless fishing sensor 140 to the mobile device 155 through air pocket 135. In the depicted example, the mobile device 155 presents the user 105 with indication of underwater object 160 and fish 165 detected based on the fishing sensor detection signal 170 reflected to the wireless fishing sensor 140 from the underwater object 160 and fish 165.

Figure 2:
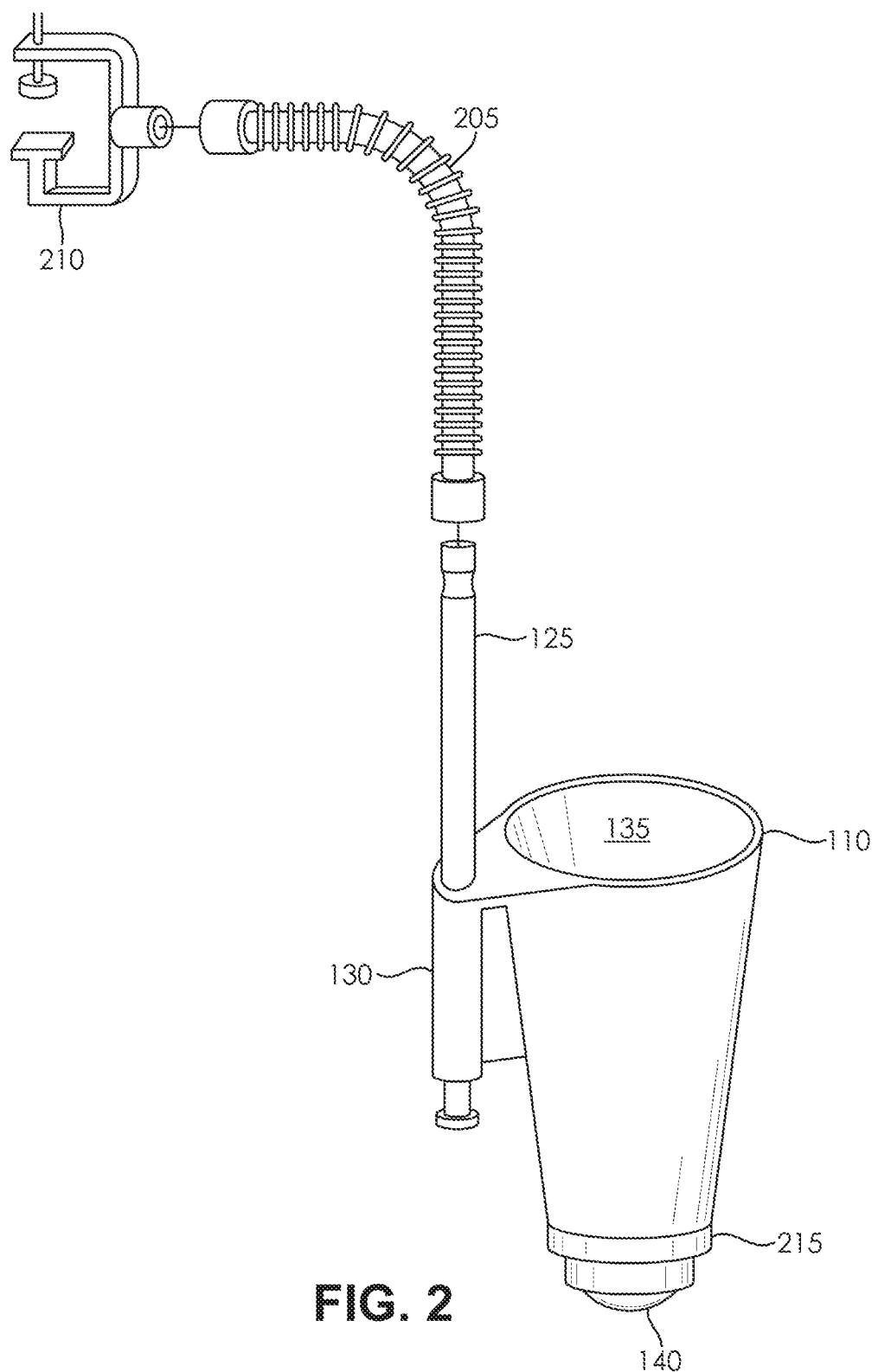
FIG. 2 depicts an exploded view of an exemplary sensor holder.

FIG. 2 depicts an exploded view of an exemplary sensor holder. In FIG. 2, the depicted sensor holder 110 is a substantially conical funnel. In some embodiments, the sensor holder 110 may be substantially cylindrical. In some designs, the sensor holder may be substantially spherical. In the illustrated embodiment, the sensor holder 110 retains air pocket 135 within the open end of the sensor holder 110. In the depicted embodiment, the sensor holder 110 retains the float rod 125 within the float rod retaining slide 130. In the illustrated embodiment, the sensor holder 110 is adjustably retained by the flexible tubing 205 rotatably coupled with clamp 210. In some embodiments, the flexible tubing may be stainless steel bellows. In various designs, the sensor holder 110 may be removably secured with the flexible tubing 205 by a quick connector. In some implementations, the flexible tubing 205 may be removably secured to the clamp 210 by a hand nut. In the depicted embodiment, the rubber ring 215 retains the wireless fishing sensor 140 with a substantially liquid-tight seal configured in the lower end of the sensor holder 110.

Figure 3:
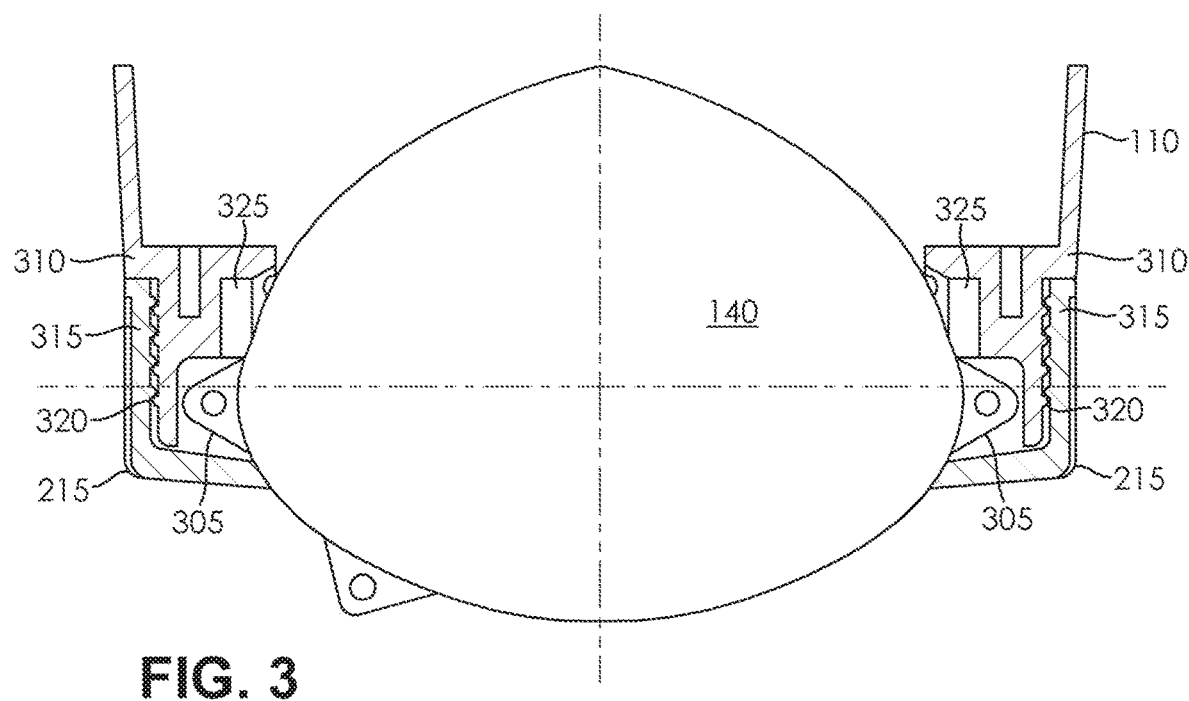
FIG. 3 depicts a cross-sectional view of an exemplary sensor holder retaining a wireless fishing sensor.

FIG. 3 depicts a cross-sectional view of an exemplary sensor holder retaining a wireless fishing sensor. In FIG. 3, sensor holder 110 retains wireless fishing sensor 140 in a substantially liquid-tight compartment sealed by the rubber ring 215. In the depicted embodiment, the wireless fishing sensor 140 is secured by sensor securing flange 305 lodged within a cavity disposed between the sensor holder 110 upper section 310 and the sensor holder 110 lower section 315. In the illustrated embodiment, the sensor holder 110 upper section 310 and the sensor holder 110 lower section 315 interlock with holder section connecting grooves 320 to securely retain the wireless fishing sensor 140 within the sensor holder 110. In the illustrated embodiment, the fishing sensor sealing ledge 325 is raised toward the sensor holder 110 open end, and disposed along the inner edge of the sensor holder 110 lower end, to securely retain the fishing sensor 140.

Figure 4:
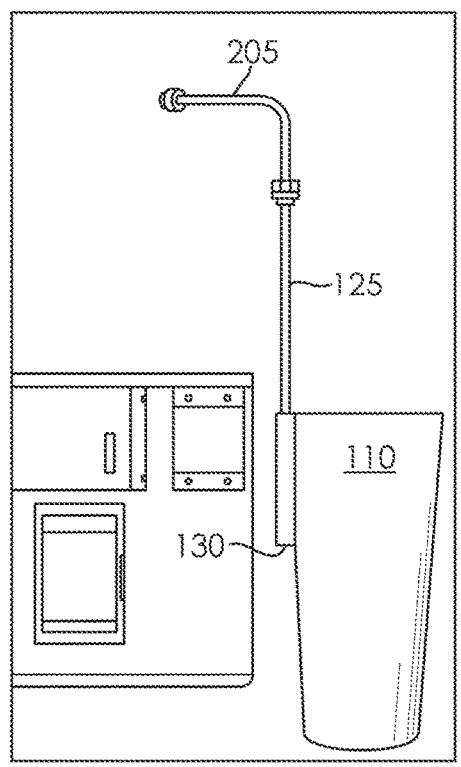
FIG. 4 depicts an assembly view of an exemplary sensor holder installation.

FIG. 4 depicts an assembly view of an exemplary sensor holder installation. In FIG. 4, the sensor holder 110 slidably retains the float rod 125 within the float rod retaining slide 130. In the illustrated embodiment, the flexible tubing 205 is configured to adjustably secure the sensor holder 110 to a fishing boat. In the illustrated example, a mounting flange is adapted to provide secure attachment of the sensor holder to a boat.

Figure 5A:
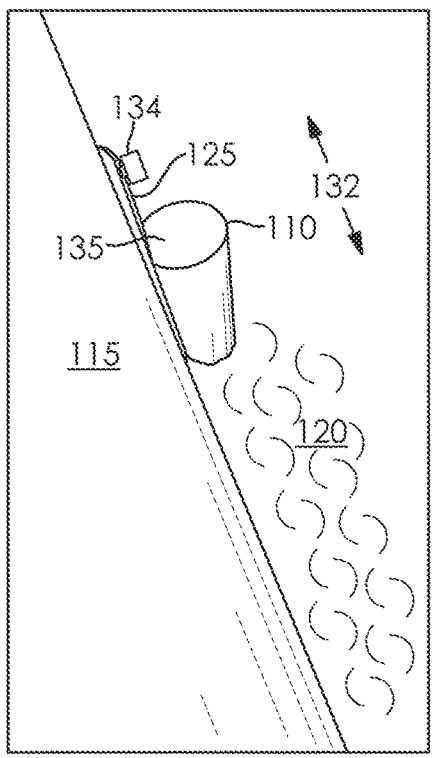
FIGS. 5A-5C depict operational views of an exemplary sensor holder mounted on a boat and floating with a bobbing action due to vertical displacement by the boat wake.
Figure 5B:
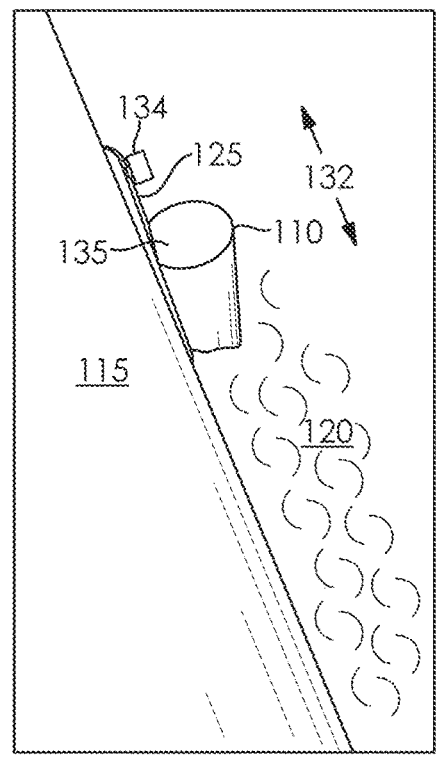
Figure 5C:
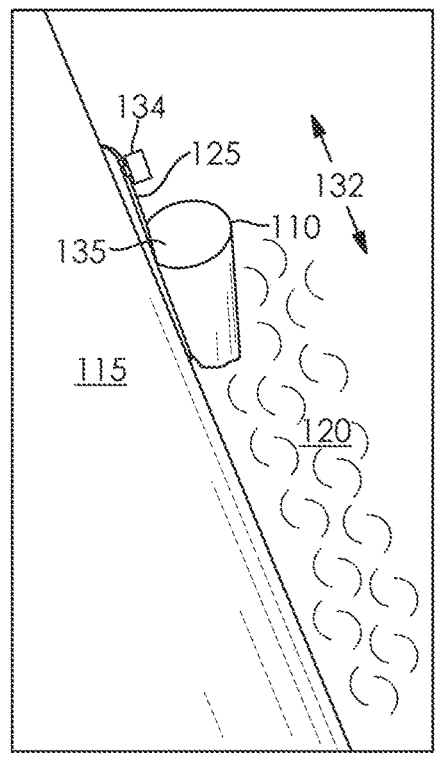

FIGS. 5A-5C depict operational views of an exemplary sensor holder mounted on a boat and floating with a bobbing action due to vertical displacement by the boat wake. In FIG. 5A, the sensor holder 110 is removably secured to fishing vessel 115 by suction cup 134 coupled with the float rod 125. In the depicted embodiment, the float rod 125 is slidably retained by the sensor holder 110 allowing the varying level of the water 120 to vertically displace the sensor holder 110 with a bobbing action along the longitudinal axis of the float rod 125, while maintaining a lower end of the sensor holder 110 below the water 120. In the example illustrated by FIG. 5A, the sensor holder 110 has been vertically displaced upward by the bobbing action 132 due to the sensor holder floating in the water 120 as the fishing vessel 115 moves through the water 120. In the example illustrated by FIG. 5B, the sensor holder 110 has been vertically displaced downward from the position illustrated in FIG. 5A, due to the bobbing action 132. In the example illustrated by FIG. 5C, the sensor holder 110 has been vertically displaced downward from the position illustrated in FIG. 5B, due to the bobbing action 132.

FIG. 6 depicts a bottom perspective view of an exemplary sensor holder. In FIG. 6, the sensor holder 110 includes float rod retaining slide 130 configured as a slotted access port disposed along the longitudinal axis of the sensor holder 110. In the illustrated embodiment, the sensor holder 110 upper section 310 and the sensor holder 110 lower section 315 are secured by the rubber ring 215.

FIG. 7 depicts a top perspective view of an exemplary sensor holder. In FIG. 7, the sensor holder 110 includes float rod retaining slide 130 configured as a slotted access port disposed along the longitudinal axis of the sensor holder 110. In the depicted embodiment, the sensor holder 110 open end provides an air pocket retained within the sensor holder 110 upper section 310. In the illustrated embodiment, the sensor holder 110 upper section 310 is sealed by rubber ring 215 to maintain the air pocket retained in the open end of the sensor holder 110.

FIG. 8 depicts a side view of an exemplary sensor holder. In FIG. 8, the sensor holder 110 float rod retaining slide 130 is disposed along the sensor holder beveled edge 805. In the depicted embodiment, the sensor holder beveled edge 805 is configured to adapt the sensor holder 110 float rod retaining slide 130 to various mounting surfaces while preserving substantially free movement of a float rod. In the illustrated embodiment, the sensor holder 110 upper section 310 is sealed by rubber ring 215 to maintain the air pocket retained in the open end of the sensor holder 110.

FIG. 9 depicts a top view of an exemplary sensor holder. In FIG. 9, the sensor holder 110 upper section 310 is sealed by rubber ring 215 to maintain the air pocket retained in the open end of the sensor holder 110.

Figure 10:
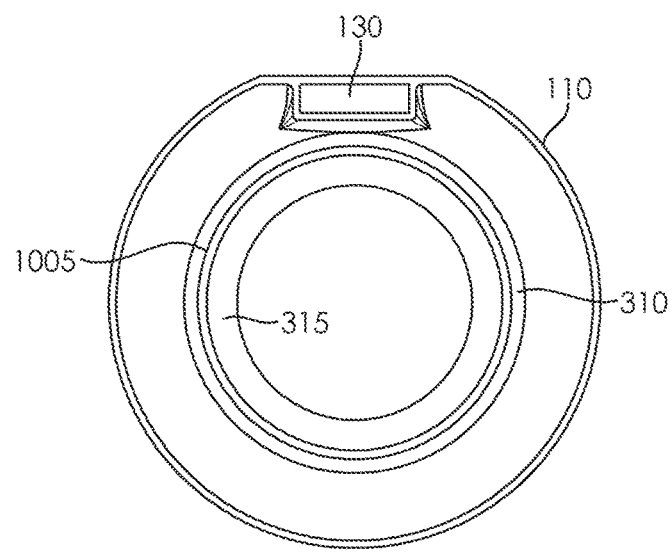
FIG. 10 depicts a top view of an exemplary sensor holder.

FIG. 10 depicts a top view of an exemplary sensor holder. In FIG. 10, the sensor holder 110 upper section 310 and the sensor holder 110 lower section 315 provide a cavity to retain a fishing sensor. In the illustrated embodiment, the sensor holder 110 float rod retaining slide 130 is open from the top of the sensor holder 110. In the depicted embodiment, the fishing sensor seal retaining groove 1005 is disposed in the sensor holder 110 and configured to retain a seal adapted to enhance the liquid-tight properties of sealing a fishing sensor.

Figure 11:
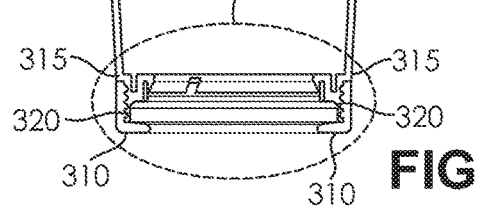
FIG. 11 depicts a side cross-sectional view of an exemplary sensor holder.

FIG. 11 depicts a side cross-sectional view of an exemplary sensor holder. In FIG. 11, the sensor holder 110 float rod retaining slide 130 is disposed along the sensor holder beveled edge 805. In the depicted embodiment, the sensor holder beveled edge 805 is configured to adapt the sensor holder 110 float rod retaining slide 130 to various mounting surfaces while preserving substantially free movement of a float rod. In the illustrated embodiment, the sensor holder 110 upper section 310 and the sensor holder 110 lower section 315 interlock with holder section connecting grooves 320 to securely retain a wireless fishing sensor within the sensor holder 110.

Figure 12:
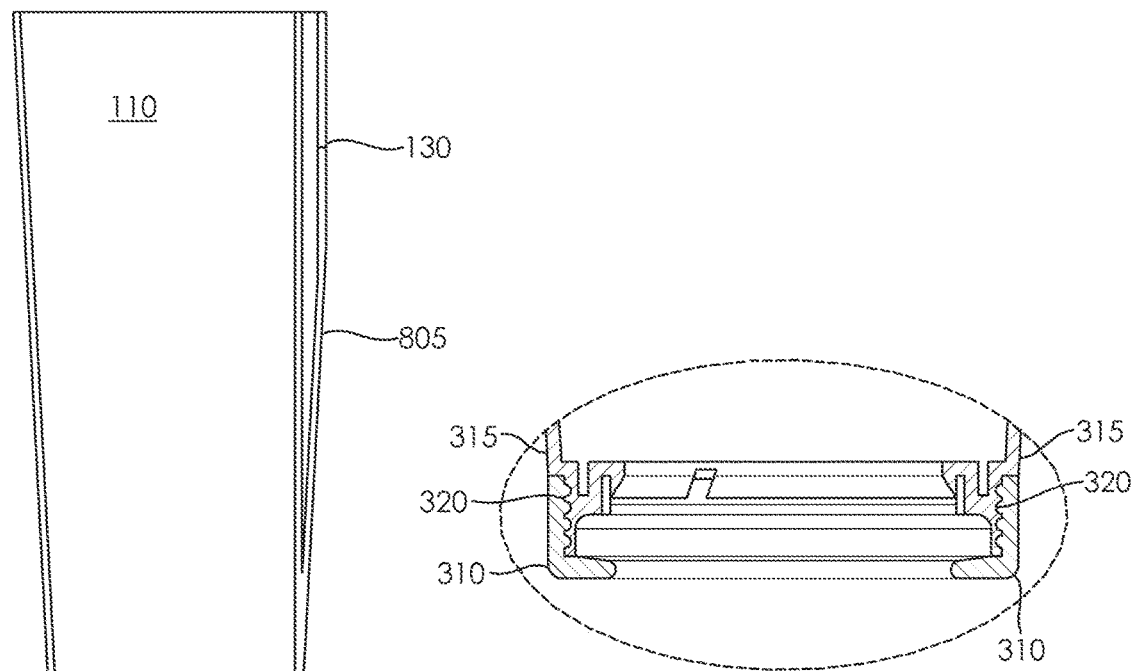
FIG. 12 depicts a bottom cross-sectional view of an exemplary sensor holder.

FIG. 12 depicts a bottom cross-sectional view of an exemplary sensor holder. In FIG. 12, the sensor holder 110 upper section 310 and the sensor holder 110 lower section 315 interlock with holder section connecting grooves 320 to securely retain a wireless fishing sensor within the sensor holder 110.

Although various embodiments have been described with reference to the Figures, other embodiments are possible. For example, some wireless fish finder designs have become popular, however, in some scenarios exemplary of prior art usage, significant drawbacks negatively impact effective use. In an illustrative example, a user attempting to locate fish with a wireless fish finder in a kayak or boat may experience difficulty maintaining the wireless connection to the fish finder due to interference from the wake of the boat or kayak. The difficulty maintaining the fish finder wireless connection may be severe if the user is fishing while trolling. For example, when fishing while trolling, the user may cause the boat to move through the water while a fishing line is in the water, to simulate a moving bait fish. In some scenarios, when the boat moves, waves are created in the water as a result of the boat wake, and the body of the sensor may go under water. In various examples of prior art usage, a wireless fish finder when submerged may lose a wireless connection with a user's mobile computing device, yet, in order to detect fish, fish finder's sonic apparatus may need to be submerged. Various embodiments of the present invention automatically adapt the fish finder depth such that the sensor can be under water and still maintain the wireless communication.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as described herein-above may be used. Many suitable materials are known and available and can be selected and mixed depending on desired strength and flexibility, preferred manufacturing method and particular use, as will be apparent to a person of ordinary skill in the art.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus, comprising:
a sensor holder, adapted to float with a bobbing action when partially submerged in a liquid while maintaining an air pocket within a first open holder end, and, configured with a liquid-tight seal adapted to removably retain an electronic sensor within a second holder end when the second holder end is submerged in the liquid; and,
a float rod, slidably retained by the sensor holder and, adapted to allow the sensor holder when partially immersed in liquid to float with a substantially vertical bobbing action along the longitudinal axis of the rod as the liquid level varies, maintaining the air pocket within the first open holder end while the second holder end is submerged in the liquid.

2. The apparatus of claim 1, wherein the sensor holder is substantially cylindrical.

3. The apparatus of claim 1, wherein the sensor holder is substantially conical.

4. The apparatus of claim 1, wherein the apparatus further comprises a clamp adapted to secure the sensor holder to a fishing vessel.

5. The apparatus of claim 1, wherein the apparatus further comprises flexible tubing adapted to adjustably position the sensor holder.

6. The apparatus of claim 1, wherein the apparatus further comprises a suction cup adapted to secure the sensor holder to a substantially planar surface.

7. The apparatus of claim 1, wherein the liquid-tight seal further comprises a rubber ring.

8. The apparatus of claim 1, wherein the liquid-tight seal further comprises a ledge raised toward the first open holder end and disposed along the inner edge of the sensor holder second end.

9. The apparatus of claim 1, wherein first and second float rod ends are fixedly retained by a mounting flange removably securable to a fishing vessel.

10. An apparatus, comprising:
a sensor holder, comprising:
an elongated holder structure, adapted to float with a bobbing action when partially submerged in a liquid, and, having a first open end, and a second end configured with a liquid-tight seal adapted to removably retain an electronic sensor;
a mounting flange, a suction cup, or a clamp, mechanically coupled with the elongated holder structure, and, adapted to secure the sensor holder to a fishing vessel; and,
a float rod, slidably retained by the elongated holder structure, and, configured to allow the sensor holder when the sensor holder is partially immersed in the liquid to float with a substantially vertical bobbing action along the longitudinal axis of the rod as the liquid level varies, maintaining an air pocket within the first open holder end while the second holder end is submerged in the liquid.

11. The apparatus of claim 10, wherein the elongated holder structure is substantially conical.

12. The apparatus of claim 10, wherein the elongated holder structure is substantially cylindrical.

13. The apparatus of claim 10, wherein the mounting flange is adapted to removably secure the sensor holder to a fishing vessel.

14. The apparatus of claim 10, wherein the apparatus further comprises flexible tubing coupled with the clamp, and configured to retain the sensor at a position adjustable relative to the clamp.

15. An apparatus, comprising:
a sensor holder, comprising:
a substantially conical funnel, adapted to float with a bobbing action when partially submerged in a liquid, having a first open end, and a second end configured with a liquid-tight seal adapted to removably retain an electronic sensor;
a rubber ring, coupled with the second funnel end;
a float rod, slidably retained by the funnel, and adapted to allow the funnel when partially immersed in liquid to float with a substantially vertical bobbing action along the longitudinal axis of the rod, while maintaining the first open end above the liquid level and the second end below the liquid level; and,
a clamp or a removable mounting flange, adapted to secure the apparatus to a fishing vessel.

16. The apparatus of claim 15, wherein the funnel further comprises a float stop configured to constrain funnel vertical displacement to a float rod length fraction predetermined as a function of float stop location.

17. The apparatus of claim 15, wherein the apparatus further comprises: flexible tubing, removably coupled with the clamp, and adapted to adjustably retain the sensor holder at a position relative to the fishing vessel.

18. The apparatus of claim 15, wherein the the apparatus further comprises a suction cup adapted to removably secure the sensor holder to the flange.

* * * * *